Jan. 24, 1950
C. W. KUHN ET AL
2,495,461
ELECTRIC HEATER CONTROLLER
Filed Dec. 29, 1947
2 Sheets-Sheet 1
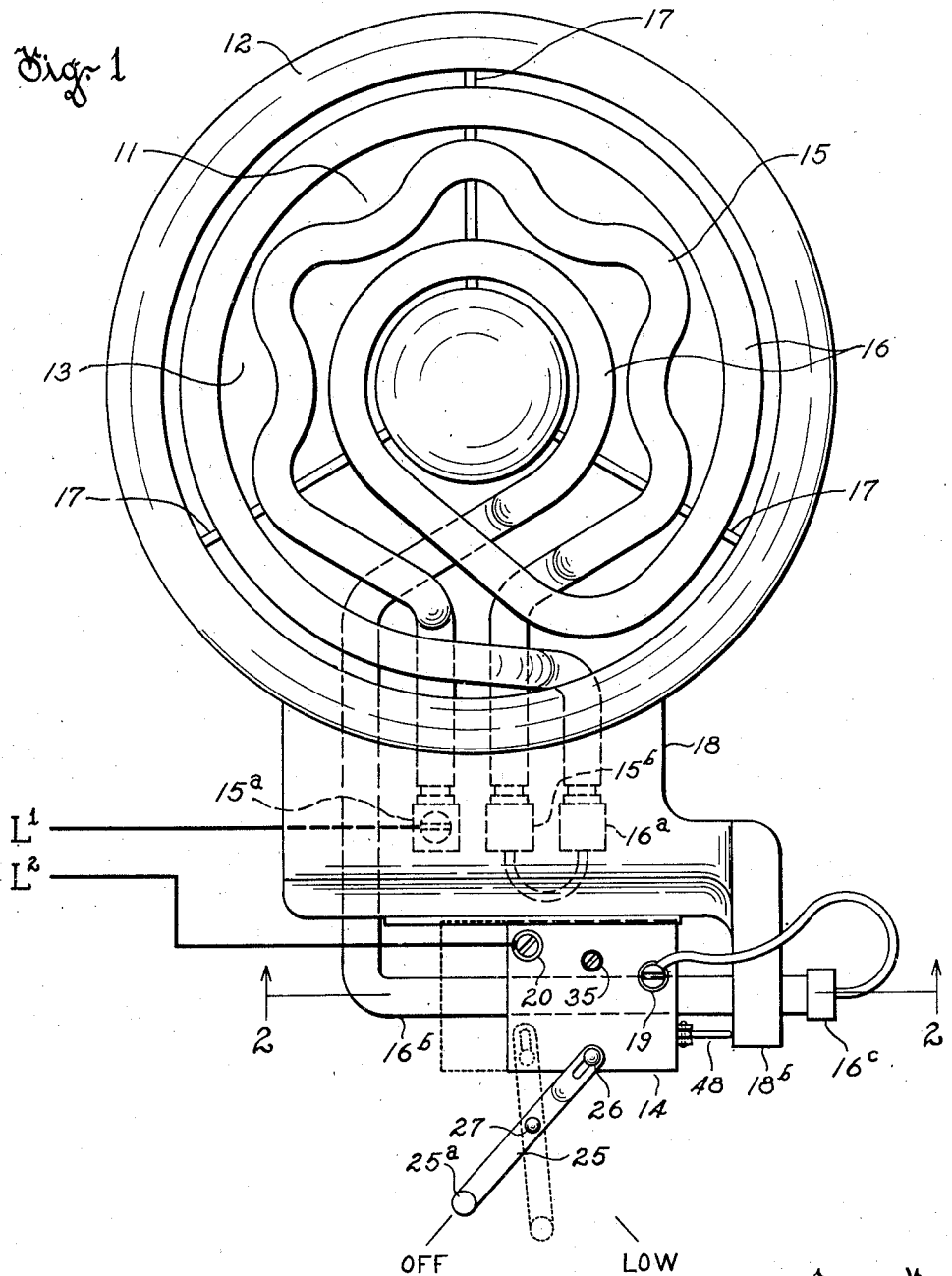
Inventors
Clarence W. Kuhn
Edwin W. Seeger
By
Attorney

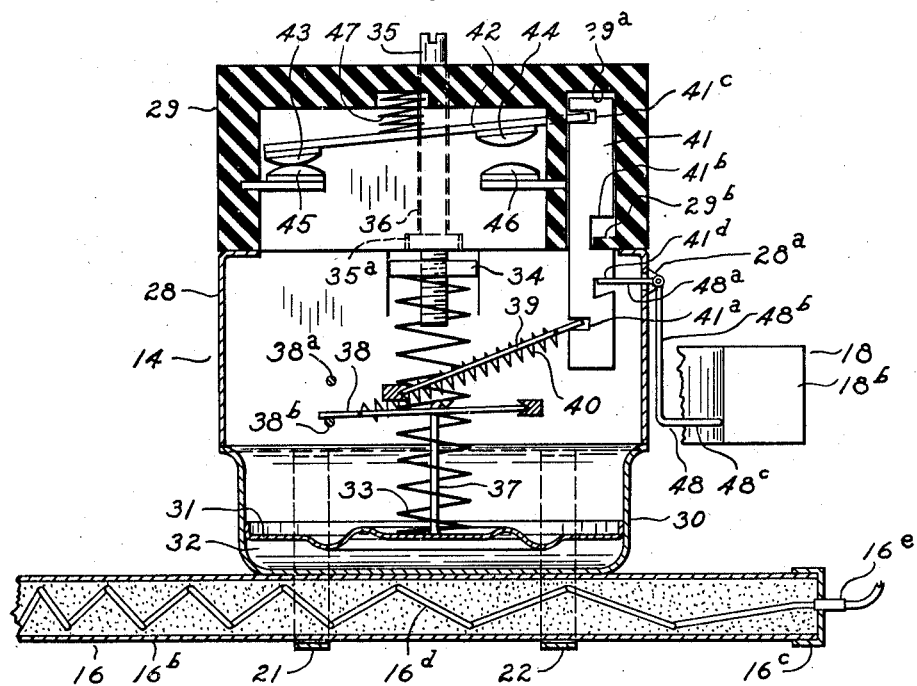

Patented Jan. 24, 1950

2,495,461

UNITED STATES PATENT OFFICE 2,495,461

ELECTRIC HEATER CONTROLLER

Clarence W. Kuhn and Edwin W. Seeger, Wauwatosa, Wis., assignors to Cutler-Hammer, Inc., Milwaukee, Wis., a corporation of Delaware Application December 29, 1947, Serial No. 794,236

6 Claims. (Cl. 219—37)

This invention relates to control of electric heaters and is particularly advantageous for control of heaters of the tubular sheathed type.

As for example for surface heaters of ranges, the tubular sheathed heater has become the popular type and there is a demand for a simpler and more effective adjustable automatic control therefor than has yet been proposed. Provision of such simpler and more effective adjustable automatic control is a primary object of the instant invention.

As ordinarily constructed tubular sheathed heaters have sheathed portions adjacent their terminal extremities confined to moderate temperatures and it is a further object to utilize the heat and temperature gradient of such a portion to afford regulable automatic control through the medium of a thermal switch.

Another object is to provide for mounting of the thermal switch on the aforementioned sheath portion of the heater whose heat and temperatures are to be utilized for control and to obtain adjustment of control by shifting the position of the switch lengthwise of said portion of the heater.

Another object is to provide control of the aforementioned type which affords maintenance of a desired heat output from a controlled heater at any of many values between off and fully on.

Another object is to provide control of the aforementioned type which further affords initial energization of a heater at a maximum rate until a desired value of heat output therefrom is attained.

Another object is to provide control of the aforementioned type which is responsive to the sum of effects produced by heat output of the heater and rate of heat transfer to the media being heated.

Other objects and advantages of the invention will hereinafter appear.

The accompanying drawings illustrate a preferred embodiment of the invention which will now be described, it being understood that the embodiment is susceptible of various modifications without departing from the scope of the appended claims.

In the drawings:

Figure 1 is a plan view of an electric grid plate together with a control device therefor.

Fig. 2 is a sectional view taken along the line 2—2 of Fig. 1, and

Fig. 3 is a view in side elevation of Fig. 1.

Referring to Fig. 1, it shows an electric grid plate 11, a mounting ring 12, a reflector pan 13 for the grid plate 11 and an adjustable control device 14 which is provided for controlling the energization of the grid plate 11.

The grid plate 11 comprises two interwoven heating elements 15 and 16 of the tubular sheathed type. Heating elements 15 and 16 are supported centrally with respect to the reflector pan 13 and the guard ring 12 by means of a conventional type of supporting spider 17. A notch is provided in mounting ring 12 to afford clearance for the terminal ends of heating elements 15 and 16 which extend outwardly beyond the former. A terminal block 18 formed of a suitable moulded insulating material is provided for support of the terminal end portions 15a and 15b of heating element 15 and also for support of the terminal end portion 16a of heating element 16. The other end of heating element 16 extends through the terminal block 18 and has an exposed right angle portion 16b which extends in a straight line and terminates at a terminal 16c. The terminal ends 15b and 16a of heating elements 15 and 16, respectively, are electrically connected in a series relation. Terminal end 15a of heating element 15 is electrically connected to the power supply line $L^1$ and terminal end 16c of heating element 16 is electrically connected to the wiring terminal 19 of the control device 14. Device 14 is also provided with a wiring terminal 20 which is connected to power supply line $L^2$.

The control device 14 is slidably supported on the aforedescribed portion 16b of heating element 16 being slidably attached by a pair of saddle brackets 21 and 22 which are best shown in Figs. 2 and 3. Device 14 has a guide 23 slidable in a guideway 24 provided on the face 18a of terminal block 18 as best shown in Fig. 3.

A lever 25 is pivotally connected at 26 to the control device 14 and is supported on a fixed pivot 27. The free end of the lever 25 is extended upwardly to form a handle 25a. The lever 25 is provided to effect sliding movement of the control device 14 along the portion 16b of the heating element 16 when said lever is moved about pivot 27. As will be later apparent, such movement of the control device 14 provides for adjustment of the ratio of the time the heating elements 15 and 16 are energized to the time that they are deenergized and also provides, when the control device is moved to one extreme position, for a positive "off" condition of said heaters.

Control device 14 generally considered comprises a thermally responsive switch of the normally closed type which is adapted to operate to an open condition for circuit interruption upon attainment of a given thermal condition. As will be understood by those skilled in the art, the structure herein disclosed for control device 14 is more or less schematically depicted and is exemplary only of one device which will operate to provide the desired control. It will be apparent that other thermally responsive electric switches of the normally closed type can also be used.

Referring particularly to Fig. 2, control device 14 is provided with a frame 28 formed from sheet metal, a contact and terminal mounting block 29 preferably formed of a molded insulating material, and a cup 30 which embodies a thermally responsive element. The block 29 and the cup 30 are suitably secured to the frame 28 oppositely with respect to one another.

The cup 30, preferably formed of sheet metal, is provided with a thin metallic diaphragm 31 which extends transversely across the inside thereof and is suitably secured to the inner side walls of the cup to form a sealed chamber 32 within the cup. The chamber 32 is provided with a limited fill of a suitable thermal fluid. The diaphragm 31 is adapted to warp concavely upwardly from the inner bottom of the cup 30 on increase in temperature of the latter due to the vapor pressure developed by its thermal fluid. A loading spring 33 of helical coil form abuts at one end against the diaphragm 31 and at its other end against a nut 34 and provides opposition to the movement of the diaphragm 31. The nut 34 is non-rotatable and has threaded engagement with an adjusting screw 35 which extends outwardly of the block 29 through opening 36. The adjusting screw 35 is provided with an enlarged portion 35a which bears on its upper side against the portion of block 29 surrounding the opening 36. A rod 37 is rigidly attached at one end to the upper side of diaphragm 31 and is provided at its other end with a portion which extends at right angles to the shank portion of the same so as to overlie a pivoted lever 38.

The lever 38 is adapted to be pivotally moved between upper and lower extreme positions as determined by fixed stops 38a and 38b which are positioned adjacent its free end. Lever 38 is operatively associated with a pivoted lever 39 through the medium of an over-center spring 40 which is attached at opposite ends to the respective levers. The free end of lever 39 engages a contact operating member 41 within a bearing notch 41a formed in the latter. The system comprising levers 38 and 39 and spring 40 provides a well-known type of snap acting mechanism affording rapid movement of the member 41 in the upward and downward directions. Lever 38 normally tends to assume an upward extreme position due to the bias of spring 40 thereby to move the member 41 to its upward extreme position. When the cup 30 is subjected to temperatures below a given value the rod 37 is adapted by means of its portion overlying lever 38 to move the latter to its lower extreme position. Under the latter condition lever 39 also assumes its lower extreme position due to the action of the spring 40 and consequently the member 41 is moved to its lower extreme position. Upon increase in temperature of the cup 30 above another given value the rod 37 moves upwardly and away from the lever 38 thereby permitting the latter, lever 39 and member 41 to assume their respective upward extreme positions as aforedescribed. As will be later apparent a fixed differential exists between the values of temperature at which levers 38 and 39 move with snap action to the upward and downward extreme positions aforedescribed.

Member 41 is adapted to move between its aforementioned upward and downward extreme positions within a guideway 29a formed in block 29. A lug portion 29b of block 29 extends outwardly into guideway 29a and projects within a cooperating notch 41b formed in member 41. Lug 29b and notch 41b, as will be apparent, provide for limiting the extent of upward and downward movement of member 41 and they also provide for the aforementioned fixed differential between the temperatures at which levers 38 and 39 move with snap action to their respective upward and downward extreme positions. If the length of notch 41b were increased or decreased, the differential would be correspondingly increased or decreased due to the fact that the upward and/or downward extreme positions of the end of lever 39, which engages member 41 within the bearing notch 41a, would be changed. Member 41 is also provided with a bearing notch 41c adjacent its upper end to engage the end of a movable contact member 42.

Member 42 is provided with contacts 43 and 44 which cooperate respectively with the stationary contacts 45 and 46 which are mounted in the block 29. The contact 45 is electrically connected with the wiring terminal 20 and the contact 46 is electrically connected with the wiring terminal 19. A compression spring 47 bears at one end against the block 29 and its other end against the upper side of the member 42. The spring 47 tends to move the member 42 downwardly so that its contacts 43 and 44 are in bridging engagement with the contacts 45 and 46 thereby to afford completion of an electrical circuit. However, when member 41 is moved to its upward extreme position by the lever 39 as aforedescribed, the member 42 is pivotally moved in the upward direction about the contact 45 and against the bias of the spring 47 so as to effect disengagement of the contact 44 from the contact 46 whereby interruption of an electrical circuit is afforded.

A bell crank lever 48 has one arm 48a extending through a slot formed in the side of frame 28 so as to engage at its extreme end within a bearing notch 41d formed in the member 41 adjacent the lower end of the latter. Lever 48 is pivotally connected to an outwardly extending bracket portion 28a of frame 28 at the juncture of its arms 48a and 48b. The arm 48b is integrally connected with an arm 48c which extends at right angles therefrom and oppositely with respect to the arm 48a. The arm 48c is provided with an enlarged end portion which is adapted to engage with an outwardly extending portion 18b of terminal block 18. As will be apparent when control device 14 is moved along the portion 16b of heater element 16 to the position depicted by solid lines in Fig. 1, the end portion of arm 48c will engage with the portion 18b and effect clockwise pivotal movement of lever 48. Such movement of lever 48 causes the member 41 to be moved to its upward extreme position aforedescribed thereby effecting disengagement of the contact 44 from the contact 46. Thus it will be seen that by moving the control device 14 to this extreme position a positive "off" condition of the device is effected regardless of the thermal condition of the cup 30.

The operation of the grid plate 11 under the control of the device 14 will now be described. As shown in Fig. 1, the device 14 is in the positive "off" condition and the circuit from the power supply line L¹ through the heating elements 15 and 16 through the control device 14 to supply line L² is in an open condition due to the disengagement of the contacts 44 and 46 in the control device 14. As the lever 25 is moved to the right from the "off" position shown in Fig. 1 to an intermediate position depicted by broken lines, the control device 14 will be moved to the left to an intermediate position also depicted in broken lines. During such movement the lever 48 moves out of engagement with the terminal block 18 and lever 48 is thereby permitted to pivotally move in the counterclockwise direction to allow member 41 to move downwardly to its lower extreme position assuming the thermostat to be cool. The contacts 43 and 44 will then be bridged by the contacts 45 and 46 and the aforedescribed circuit will be completed through the control device 14 to effect energization of the heater elements 15 and 16. Ultimately when sufficient heat is imparted to the cup 30, due to heating of the heating element exposed end portion 16$^b$, the vapor pressure in the chamber 32 increases and the diaphragm 31 warps upwardly against the opposition of the loading spring 33. The upward warping of the diaphragm 31 causes simultaneous upward movement of the rod 37. When the rod 37 has moved upwardly a sufficient amount, the levers 38 and 39 will move upwardly with snap action to assume their upward extreme position as aforedescribed. The members 41 and 42 are thereby moved upwardly to effect disengagement of the contacts 44 and 46 whereupon the circuit is interrupted and the heating elements 15 and 16 are deenergized.

The heating elements 15 and 16 then cool and the temperature of the cup 30 decreases. When the temperature of the latter has decreased below the given value first mentioned in the foregoing, reverse action of the control device 14 occurs and heating elements 15 and 16 are ultimately reenergized by re-engagement of contacts 44 and 46. The aforementioned cycle of operation of the control device 14 is then repeated continuously until it is moved to the position where the positive "off" is effected.

Control device 14 may be moved to any position along the portion 16$^b$ of the heating element 16 between the extreme position at the right end of the latter where the positive "off" condition is effected and the point where the element 16 bears at right angles toward the mounting ring 12. Moving device 14 closer to the latter position effects a decrease in the ratio of the time the contacts 44 and 46 are closed to the time that they are open for the same thermal conditions. This is due to the fact that a definite temperature gradient exists along the portion 16$^b$ of element 16 which decreases in the direction of the end terminal 16$^c$ whenever the heating element 16 is energized.

Referring to Fig. 2, it shows a preferred form of construction for a helical coil resistor 16$^d$ which is encased within the heating element 16. That portion of resistor 16$^d$ which lies within the portion 16$^b$ of element 16, is constructed in the form of a gradually attenuated helix with the space between adjacent coils gradually increasing toward the terminal end 16$^c$. Adjacent the end 16$^c$ it is connected to a terminal member 16$^e$ which projects outwardly from the casing end. Such a form for the resistor 16$^d$ provides for a gradual temperature gradient along the sheath of the portion 16$^b$ of heating element 16 when the latter is energized by control device 14. As will be apparent, a gradual temperature gradient along the straight portion of heating element 16 is desired in order that the change in the period of cycling of the control device 14 will bear a substantially linear relationship with respect to the distance the latter is moved between intermediate positions along the portion 16$^b$ of heating element 16. If desired, a conventional type of resistor can be used in place of the resistor 16$^d$; but the temperature gradient produced along the sheath of the portion 16$^b$ will not be as gradual as when the preferred form of resistor 16$^d$ is used.

The operating temperatures of control device 14 is determined by the degree of tension exerted by the loading spring 33 on diaphragm 31. The tension of spring 33 may be changed by appropriate adjustment of the adjusting screw 35 with respect to the nut 34. As aforedescribed, a fixed differential exists between the temperature at which control device 14 will operate to its open circuit condition and the temperature at which it will operate to return to its closed circuit condition. Adjustment of the screw 35 as aforedescribed shifts these temperatures upwardly or downwardly, as the case may be, by the same amount.

As will be apparent, the control device 14 will operate at definite temperatures depending upon the aforedescribed adjustment. Preferably the desired setting is arrived at by first determining the position of control device 14 on the portion 16$^b$ of heating element 16 where the lever 48 just disengages the portion 18$^b$ of block 18 to permit the former to operate to its circuit closed condition from the aforedescribed positive "off" condition. Then the maximum steady temperature attained by the portion 16$^b$ of heating element 16 in contact with the cup 30 in such position, during continuous energization of the former, is determined. Control device 14 is then adjusted by means of the adjusting screw 35 to operate from its circuit closed condition to its circuit open condition at a temperature slightly above the temperature determined above. Such a setting will provide for continuous energization of heating elements 15 and 16 in the above described position of control device 14 and will insure that the latter will provide cycling control in all intermediate positions to the left along the portion 16$^b$ of heating element 16; the period of such cycles decreasing in a direct relation to the distance the control device 14 is moved to the left along the straight portion of element 16.

As will be apparent control device 14, following initial movement of the same from the position where its positive "off" condition is effected to an intermediate position on the element 16, will have a first cycle of operation which is variable with respect to time depending upon the quantity and rate of heat absorption of the media being heated. This is due to the fact that the aforementioned temperature gradient along the straight portion will build up to its maximum or steady temperature values at an inverse rate to the decrease in rate of heat absorption by the media being heated.

What we claim as new and desire to secure by Letters Patent is:

1. In combination, an electric heater of the tubular sheathed type having a portion of its sheath characterized by having between points spaced longitudinally thereof a temperature gradient as an incident to energization of said heater, a circuit completing and interrupting means for said heater comprising a thermally responsive control element in heat exchange relation with said sheath portion of said heater, and means for adjusting the position of said thermally responsive element along said sheath portion of said heater to utilize the temperature gradient of the latter for adjustment of control by said means.

2. In combination, an electric heater of the tubular sheathed type having a portion of its sheath characterized by having between points spaced longitudinally thereof a temperature gradient as an incident to energization of said heater, a circuit completing and interrupting means for said heater comprising a thermally responsive control element in direct contact with said sheath portion of said heater, and means for adjusting the position of said thermally responsive element along said sheath portion of said heater to utilize the temperature gradient of the latter for adjustment of control of said means.

3. In combination, an electric heater of the tubular sheathed type having a portion of its sheath characterized by having between points spaced longitudinally thereof a temperature gradient as an incident to energization of said heater, a circuit completing and interrupting unit for said heater slidably mounted on said sheath portion of said heater and comprising a thermally responsive control element in direct contact with said sheath portion of said heater, and means for adjusting the position of said thermally responsive element along said sheath portion of said heater to utilize the temperature gradient of the latter for adjustment of control by said unit.

4. In combination, an electric heater of the tubular sheathed type having a sheathed end portion characterized by having between points spaced longitudinally thereof a temperature gradient as an incident to energization of said element, a circuit completing and interrupting unit slidably mounted on said heater and comprising a thermally responsive control element in contact with said sheath portion of said heater, and means for adjusting the position of said thermally responsive element along said sheathed end portion of said heater to utilize the temperature gradient of the latter for adjustment of control by said unit.

5. In combination, an electric heater of the tubular sheathed type characterized by having between points spaced longitudinally thereof a temperature gradient as an incident to energization of said element, an automatic circuit completing and interrupting unit slidably mounted on said sheath portion of said heater and comprising a thermally responsive control element in direct contact with said sheath portion of said heater, switch contacts operable by said element to complete and interrupt circuit according to the thermal condition of said element and manually operable means for adjusting said element along said sheath portion of said heater to utilize the temperature gradient of the latter for adjustment of control by said unit or optionally to remove said contacts from influence by said thermally responsive control element.

6. In combination, an electric heater of the tubular sheathed type provided with a helical coil resistor having along a portion thereof adjacent a terminal extremity of said heater progressively increasing spaces between its coils in the direction of said extremity to effect a temperature gradient along the portion of the sheath of said heater overlying said portion of said resistor as an incident to energization of the latter, an automatic control unit for said heater slidably mounted on said sheath portion of said heater and comprising a thermally responsive control element in direct contact with said sheath portion of said heater, switch contacts to complete and interrupt circuit according to the thermal condition of said element, and manually operable means for adjusting said element along said sheath portion of said heater to utilize the temperature gradient of the latter for adjustment of control by said unit.

CLARENCE W. KUHN.
EDWIN W. SEEGER.

REFERENCES CITED

The following references are of record in the file of this patent:

UNITED STATES PATENTS

| Number | Name | Date |
| --- | --- | --- |
| 1,839,630 | Williams | Jan. 5, 1932 |
| 1,919,950 | Kerr | July 25, 1933 |
| 2,034,486 | Rohne | Mar. 17, 1936 |
| 2,060,713 | Wright et al. | Nov. 10, 1936 |